United States Patent [19]
Dodson et al.

[11] Patent Number: 4,570,912
[45] Date of Patent: Feb. 18, 1986

[54] PNEUMATIC SPRING COUNTERBALANCE HAVING IMPROVED DAMPING STRUCTURE

[75] Inventors: Daniel P. Dodson, Florence; George C. Ludwig, Marion, both of S.C.

[73] Assignee: AVM, Inc., Marion, S.C.

[21] Appl. No.: 433,421

[22] Filed: Oct. 8, 1982

[51] Int. Cl.³ ............................................. B60G 11/26
[52] U.S. Cl. ................................ 267/64.15; 188/284; 188/322.22; 267/124
[58] Field of Search ............... 267/120, 119, 121, 130, 267/122, 123–129, 64.26, 64.15; 188/322.11, 322.17, 322.22, 322.18, 284, 282, 266, 315, 318, 320

[56] References Cited

U.S. PATENT DOCUMENTS

| | | | |
|---|---|---|---|
| 2,818,942 | 1/1958 | Bliven | 188/315 |
| 3,003,596 | 10/1961 | Carbon | 188/322.22 |
| 3,272,494 | 9/1966 | Lucien et al. | 267/120 |
| 4,221,367 | 9/1980 | Smith | 267/64 R |

FOREIGN PATENT DOCUMENTS

| | | | |
|---|---|---|---|
| 2752265 | 5/1979 | Fed. Rep. of Germany | 188/284 |
| 0045448 | 4/1979 | Japan | 267/120 |
| 1033810 | 6/1966 | United Kingdom . | |
| 1132038 | 10/1968 | United Kingdom . | |
| 1226534 | 3/1971 | United Kingdom | 267/124 |
| 1495409 | 12/1977 | United Kingdom . | |
| 1502971 | 3/1978 | United Kingdom . | |
| 2058287 | 8/1979 | United Kingdom | 267/120 |
| 2012913B | 8/1979 | United Kingdom . | |
| 2070192A | 9/1981 | United Kingdom . | |
| 2096732A | 10/1982 | United Kingdom . | |

Primary Examiner—Duane A. Reger
Assistant Examiner—Michael P. Gilday
Attorney, Agent, or Firm—LeBlanc, Nolan, Shur & Nies

[57] ABSTRACT

A pneumatic spring counterbalance extensible link including a closed end cylinder with an end connector, a piston and rod assembly within the cylinder and maintained therein by the crimped over end portion of the cylinder retaining a rod bushing and rod to cylinder seal assembly. The cylinder is pressurized preferably prior to assembly of the bushing and seal assembly into the cylinder. The piston assembly includes an effective check valve and orifice by-pass structure for metered gas flow past the piston in one direction and free flow past the piston in the other direction of piston movement. A small predetermined amount of oil is contained in the cylinder and provides lubrication for the seals and piston and provides a damping effect at the end of the extension stroke. A standpipe sleeve is secured on the piston extending toward the seal assembly around the piston rod and controls disposition of the oil to assure damping at the end of the extension stroke. A piston and piston ring structure enhance reliability of control of the oil flow, by providing a peripheral piston to cylinder seal and assures that fluid only passes across the piston via the check valve and orifice by-pass structure in the piston.

20 Claims, 16 Drawing Figures

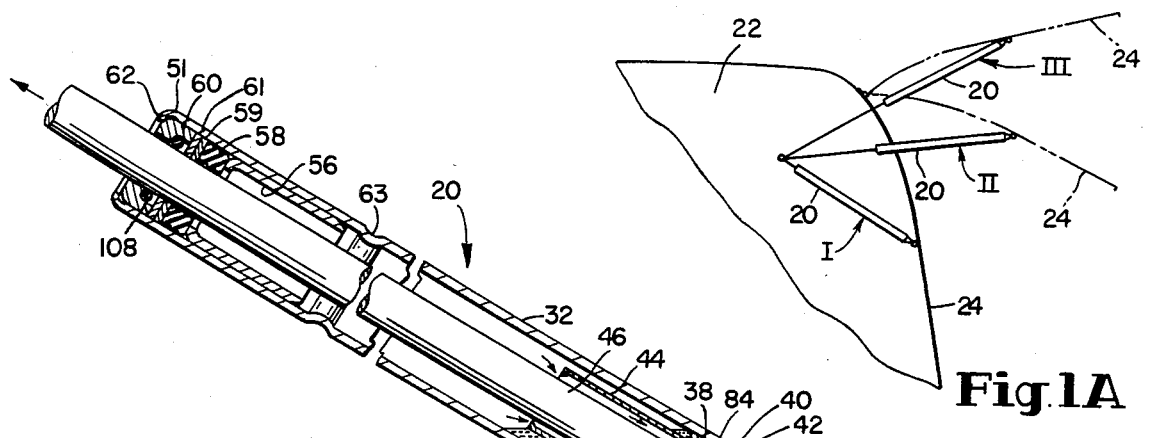
Fig.1A
Fig.1
(POSITION I)
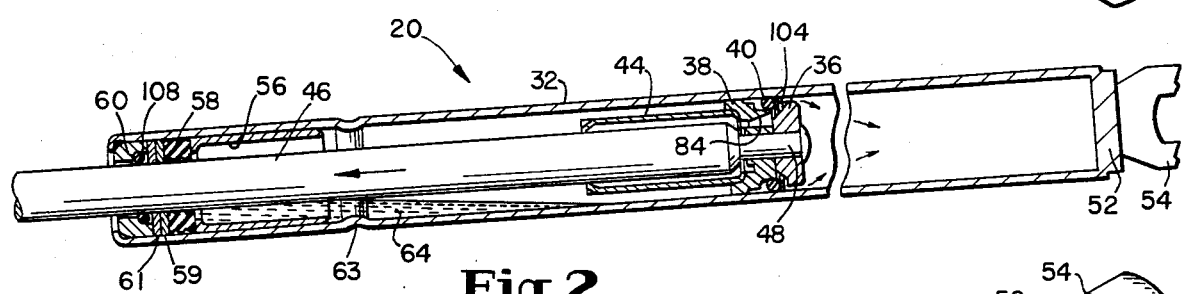
Fig.2
(POSITION II)
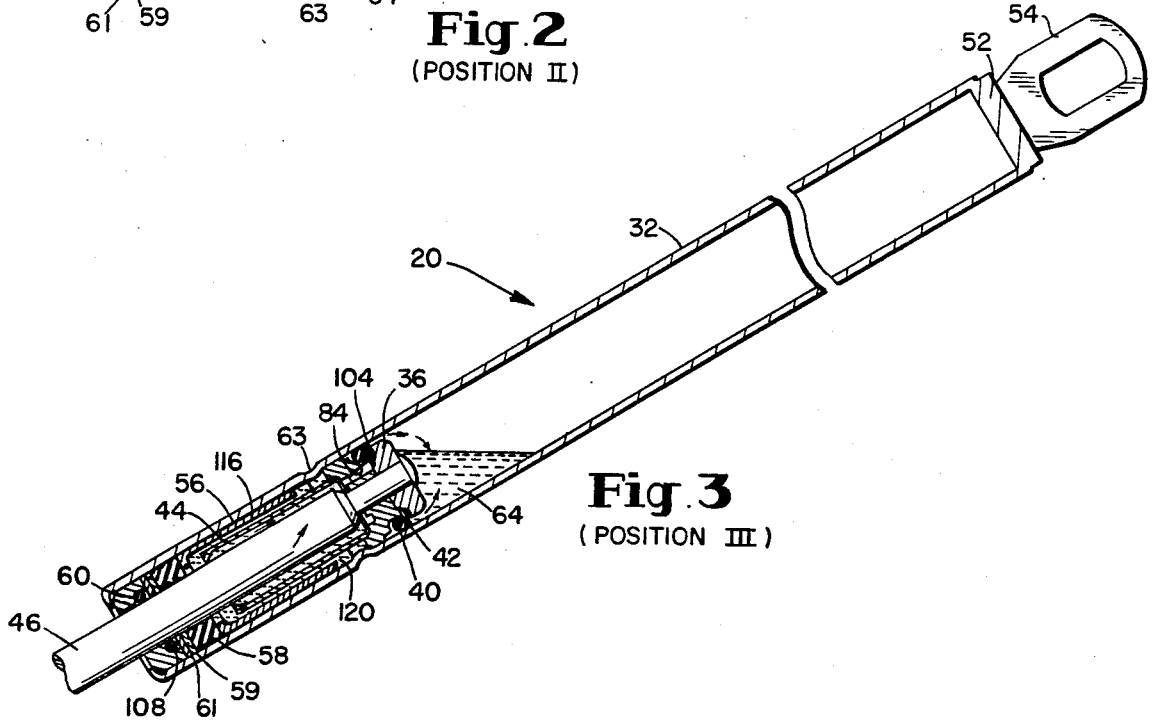
Fig.3
(POSITION III)

U.S. Patent  Feb. 18, 1986  Sheet 2 of 3  4,570,912
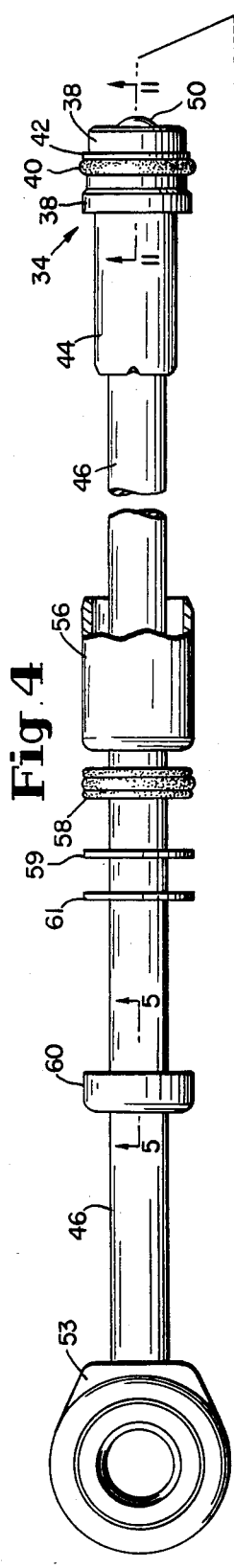
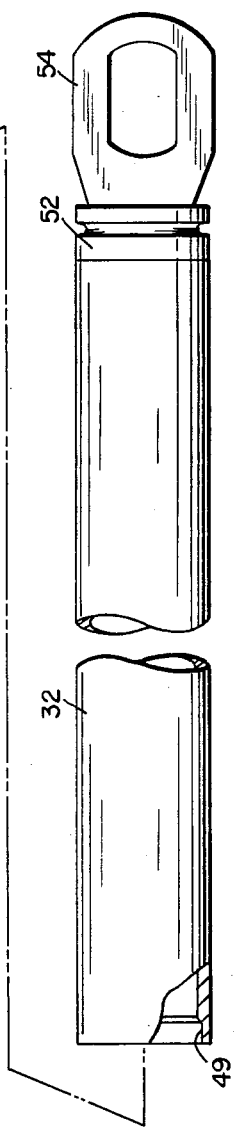
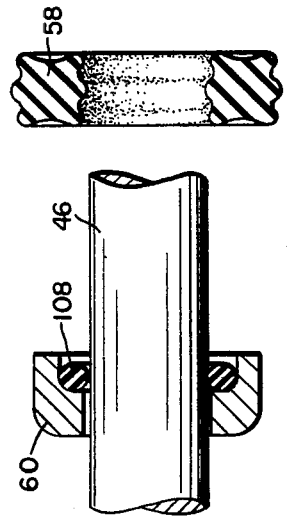
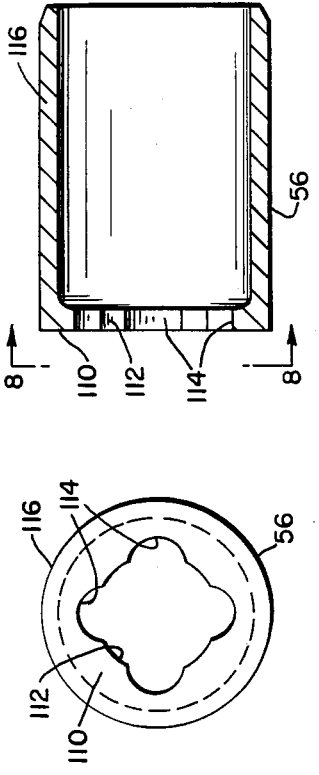
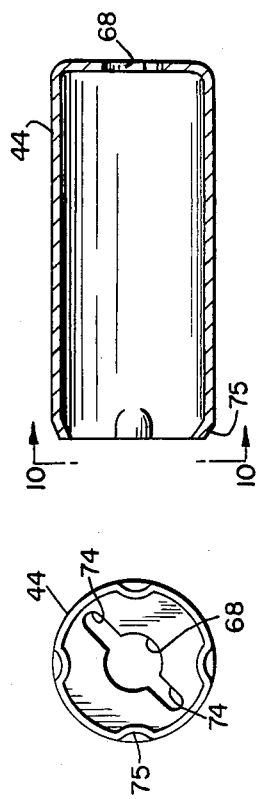

PNEUMATIC SPRING COUNTERBALANCE HAVING IMPROVED DAMPING STRUCTURE

BACKGROUND OF THE INVENTION

Articles known as pneumatic or gas springs, which for convenience can be referred to as counterbalance links have become common in commercial articles, particularly in the automotive industry, but they are being used in many other fields wherever the need is present to provide a counterbalance force for closure units, such as lids, doors and cabinet fronts, and gas spring replacement for mechanical spring fittings has become prevalent. In some fields of use particularly in the automotive field where the pneumatic springs are used on each side of trunk lids and hatch backs the springs counterbalance the weight of the lid or hatch back. They are compressed when the lids are closed and extend under differential pressure force acting on the piston when the lid is opened. The control orifice by-pass effectively slows the opening speed of the lid. As improvements have occurred, it became desirable to utilize the small amount of lubricating oil, included in the springs, at the rod side of the piston to create a dampening action as the spring approaches the end of the extension stroke.

In automotive installations, particularly on hatchbacks, the counterbalance tilts back and forth between a shaft up angle and a shaft down angle. When the counterbalance is in the shaft up position any of the lubricating oil trapped above the piston slowly flows down below the piston, thus there is no oil on the shaft side of the piston to provide damping at the end of the expansion stroke.

Examples of prior art pneumatic counterbalance which involve damping of the shaft stroke are seen in the following U.S. Patents: U.S. Pat. No. 4,221,367 to L. O. Smith for Gas Spring With Two stage Damping; and U.S. Pat. No. 4,310,148 to H. Freitag for Cylinder and Piston Device.

SUMMARY OF THE INVENTION

Damping at the end of the extension stroke has been complicated when counterbalance units are installed in vehicles because many installations have the shaft or piston rod angled upward when the lid or hatch is in a closed position. With most previously known counterbalances, when positioned with the shaft angled upward, the oil will slowly flow past the piston to the closed end of the cylinder and there will be no oil in the other end of the cylinder to damp the end of the expansion stroke.

This present invention has as an object the solution of the problem by modifying to a unique orifice groove type of piston with a sealing O-ring cooperation between piston and cylinder to prevent fluid including oil from leaking past the periphery of the piston. A standpipe sleeve has been added to the shaft side of the piston to direct oil and gas within the standpipe to and from the flow control structure of the piston while providing a reservoir around the periphery of the standpipe to assure sufficient oil always being retained above the piston when the counterbalance unit is angled with the shaft upward.

Additional novel objects reside in providing a two part piston construction with a bi-directional elastomeric O-ring seal in a special peripheral recess between the piston parts. An annular space, adjacent the seal, carries a metal washer which can be axially urged by the O-ring against a radial annular face on one of the piston parts and in that face is a lateral orifice groove. In one direction of stroke the O-ring moves and seals against the washer pressing it against the grooved face to provide a metering passage through the groove. Within the annular recess and radially inward of the O-ring seat is a flow passage in communication with the orifice groove and through the other piston part into the shaft side of the cylinder. This novel piston structure cooperates with the unique standpipe arrangement to provide fluid communication across the piston and into the shaft side of the piston-cylinder combination through the interior of the standpipe whereby oil between the exterior of the standpipe and the cylinder is retained by the piston O-ring seal against flow back past the piston into the other end of the cylinder.

As a further object, the unique piston structure can be constructed with one of its parts and/or the washer adapted to have a close free fit with the cylinder wall and be made from a good electrically conductive material such as brass, bronze or copper steel. Similarily the shaft to cylinder end retainer bushing normally disposed at the crimped end of the cylinder can, if desired, be made from an electrically conductive metal such as hard brass or bronze. These unique features enable the inherent electrical conductivity of the counterbalance unit to be effectively enhanced.

Further novel features and other objects of this invention will become apparent from the following detailed description, discussion and the appended claims taken in conjunction with the accompanying drawings.

BRIEF DESCRIPTION OF THE DRAWINGS

A preferred structural embodiment of the pneumatic counterbalance of this invention is disclosed in the accompanying drawings, in which:

FIGS. 1, 2 and 3 illustrate the pneumatic spring counterbalance of the present invention, the counterbalance being shown as partially broken in length dimension and in section, the respective figures showing the changes in position of the counterbalance from a compressed position to an expansion position when installed;

FIG. 1A is a diagramatic sketch representing the counterbalance installed on a hatch back and showing the three positions of the counterbalance between hatch closed and hatch open as corresponding to the counterbalance depicted in FIGS. 1, 2 and 3.

FIG. 4 is an enlarged exploded view showing the components partially broken-away of the counterbalance shown in FIG. 1;

FIGS. 5–14 are still further enlarged views of various components of the counterbalance;

FIG. 5 shows the shaft retaining bushing;

FIG. 6 shows the shaft seal;

FIGS. 7 and 8 show a longitudinal section and an end view respectively of a supplemental bushing;

FIGS. 9 and 10 show a longitudinal section and end view respectively of a standpipe collar or sleeve member secured on the shaft adjacent the piston;

FIG. 11 is a sectioned view of the piston subassembly secured on the end of the piston rod;

FIGS. 12 and 13 show a longitudinal section and end view respectively of the bushing part of the piston unit; and FIGS. 14 and 15 show a longitudinal section and end view respectively of the other orifice part of the piston unit.

GENERAL DESCRIPTION

Figure 11:
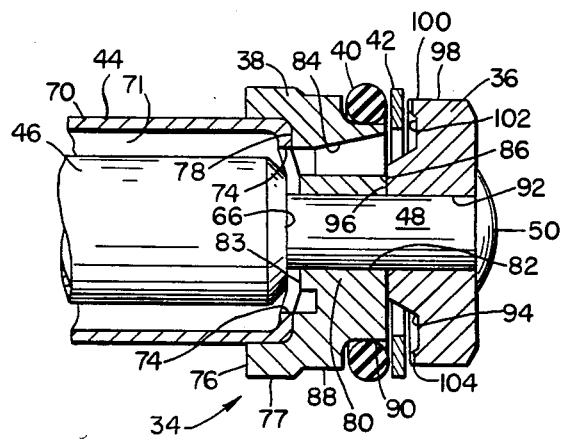

The invention herein is in an improved article known as a pneumatic or gas spring which for convenience, can be designated as a counterbalance link. FIGS. 1, 2 and 3 show the assembled details of the counterbalance unit 20 in various positions assumed between the compressed condition and an extended (expansion) condition when the counterbalance is installed on the hatchback of a vehicle. In the schematic diagram FIG. 1A, the rear part of a vehicle 22 is diagramatically shown with the hatch 24 closed (position I), partially open (position II) and fully open (position III). The respective FIGS. 1, 2 and 3 positions of the counterbalance unit 20 coorelate with the three positions I, II, and III on FIG. 1A.

FIG. 1 illustrates the components of counterbalance link 20 with a cylinder 32 whose length will be determined by the kind of equipment with which the unit is used. Within the cylinder is a piston assembly 34 which separates the cylinder into two compartments filled with gas (e.g., air, nitrogen or some other inert gas) under pressure. The piston assembly includes a free fitting piston 36, a special piston bushing 38, a piston ring 40, a piston ring washer 42, a standpipe sleeve 44, and the piston rod or shaft 46 secured at one end 48 to the piston assembly 34 as by swaging over or riveting the end at 50. These pneumatic counterbalance units, particularly in automotive installations are often pressurized up to around 2000 psi gas pressure. Pressures can be higher or lower depending on the installation. A counterbalance unit with a piston rod having approximately 0.10 inch cross-section area will provide a 5 pound extension force when the cylinder is pre-pressurized at approximately 50 psi, and a 200 pound force when pressurized at 2000 psi.

The piston shaft 46 projects out through one end 51 of cylinder 32, the other end of which is completely closed, as by welding an end plug or disc 52 thereto. The projected end of shaft 46 has a connector link 53 (see FIG. 4) rigidly secured thereto, as by screw threads or welding, and a second connector link 54 is secured to the cylinder closed end 52, as by screw threads or welding. Within the cylinder, shaft 46 passes through a cup-shaped bushing 56, a large bi-directional ring seal 58 (known as a Quad-seal), a Teflon washer 59, a half hard brass washer 61 and a shaped bushing 60 which has a free fit around the shaft 46 and within cylinder 32. With the undercut cylinder end 51 crimped at 62, internal gas pressure keeps the seal 58, washers 59 and 61, and bushing 60 in the end position against the crimped end of cylinder 32. The rolled indentation 63 in the cylinder wall provides an end stop abutment for piston movement. As shown in FIGS. 1-3, a pre-determined small quantity of oil 64, e.g., 3-4 cc is placed into cylinder 32 prior to assembly and provides lubrication for the piston O-ring 40 and the large O-ring seal 58, and provides liquid for damping at the end of the expansion stroke.

Suitable materials for the various components can be mandrel drawn hydraulic steel tubing for the cylinder, sheet steel for the end disc; the piston shaft is hardened, chrome plated steel; the bushing 60 is preferably made from half hard brass but can be made from other materials, such as aluminum or steel, the Quad-ring is elastomeric, e.g. rubber or plastic, and the piston components 36 and 38 are made from copper steel or they can be made from other materials, such as plastic, brass, aluminum, etc.

The piston assembly and its ring components 40 and 42, are constructed to provide controlled by-pass flow of gas from one side of the piston to the other side. There is a relatively free flow by-pass provided during the retraction or compression stroke and an "orifice" metered flow of gas past the piston during the extension or expansion stroke.

FIG. 4 shows the various components which are carried by the piston shaft 46, and FIG. 11 shows the piston end of the shaft in greater detail, as will now be described. End 48 of piston shaft 46 is of reduced diameter providing a shoulder 66.

Standpipe sleeve 44 is a deep drawn cup, and can be made from aluminum. The bottom of sleeve 44 is apertured at 68 (see FIG. 10) to fit over the piston shaft end and against the shaft shoulder 66. Standpipe wall 70 is cylindrical and dimensioned to provide an internal annular spacing 71 between the shaft 46 and the standpipe. The external diameter of standpipe sleeve 44 is substantially less than the I.D. of cylinder 32 for a purpose to be described. The aperture 68 is intersected by two slots 74 piercing the bottom wall of the standpipe sleeve and radially extending beyond the shoulder 66 of shaft 46 providing a flow passage of oil from and to the standpipe sleeve. The other end of sleeve 44 has several indents 75 to assure substantially coaxial alignment with the shaft when assembled.

Figure 12:
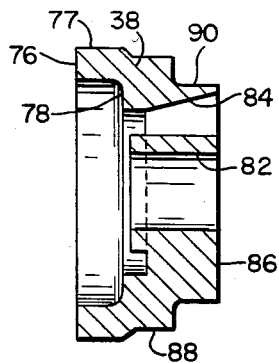
Figure 13:
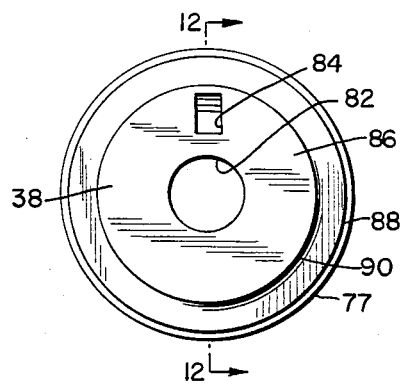
Figure 15:
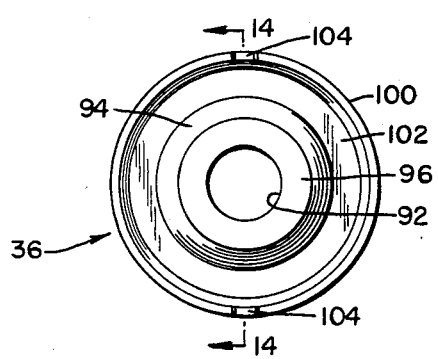
Figure 14:
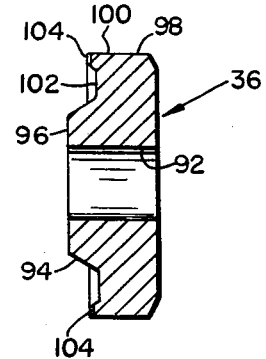

The bushing part 38 (see FIGS. 12 and 13) of the piston assembly has one end 76 with a cylindrical peripheral portion 77 having an O.D. providing a close free sliding fit with the I.D. of cylinder 32. Because the bushing part 38 is rigidly secured on the shaft and its peripheral portion 77 always contacts the cylinder, the bushing provides an excellent electrically conductive path between the shaft and the cylinder. Bushing 38 has a countersunk cup-shaped seat 78 which embraces the periphery of the cupped bottom of standpipe sleeve 44 and retains the sleeve against shaft shoulder 66. The internal boss 80 has a bore 82 which fits over the reduced end 48 of the piston shaft, and in assembly the end face 83 of boss 80 abuts and clamps the bottom of the standpipe with a deformation against the shoulder 66 of shaft 46. Space for oil to flow to and from the standpipe 44 is via the bottom slots 74. A rather large axially directed through passage 84 from within the cup-shaped end of the bushing to the opposite end face 86 provides continuation of an oil flow path from the standpipe through the bushing.

The outer circumference of the bushing part 38 is stepped radially inward at an intermediate portion 88 to clear that portion of the bushing from contact with the cylinder. Between the intermediate annular area 88 and the end 86, bushing 38 has an external reduced diameter which provides a peripheral radial seat 90 for the elastomeric O-ring piston ring 40. O-ring 40 is dimensioned to engage and provide a sliding sealed fit between the bushing seat 90 and the inner surface of cylinder 32 yet it can move a slight distance in an axial direction along the seat surface 90.

The other piston part 36 is a cylindrical disc, with a central through bore 92 which slides over the piston shaft reduced end 48. Its side adjacent the bushing part 38 is shaped with a reduced diameter center embossment 94 with a flat end face 96 abutted against the face 86 of bushing part 38. The outer circumference 98 has a lesser diameter than the I.D. of the cylinder so there is a free annular space enabling unobstructed flow of gas between piston part 36 and the cylinder wall. When the piston parts 36 and 38 are fitted on reduced shaft end 48 against the bottom of standpipe sleeve 44, the end 50 of reduced end 48 is swaged or riveted over to tightly clamp the piston assembly parts 36, 38 and 44 on the end of the piston shaft 46. So assembled the piston parts 36 and 38 constitute an effective spool shaped piston with the ring shaped washer 42 and the O-ring 40 retained in the peripheral space between the parts 36 and 38.

Piston part 36, radially outward from and between the embossment 94 and an outer peripheral axially directed flange 100, is axially recessed at 102 to provide free flow space from the embossment to the flange 100. Flange 100 has a narrow terminal annular edge which is disrupted by one or more shallow orifice grooves 104. The ring shaped flat washer 42, which is loosely retained between the axial flange 100 of part 36 and the end face 56 of bushing part 38 retains the O-ring seal 40 on the axial seat 90 of the bushing 38. Gas under pressure in the chamber of the counterbalance which is occupied by the piston shaft attempts to flow past the bushing 38 into the chamber at th closed end of the cylinder but the O-ring seal prevents gas flow past the O-ring 40 which is moved to seal against the washer 42 and urges the washer against the end edge of the piston flange 100 which creates metered flow paths between the washer 42 and the orifice grooves 104 in the flange 100 from the inner piston.

When the piston is forced to a compressed counterbalance condition (movement to the right in FIG. 3) washer 42 moves away from the piston flange 100 and permits unrestricted gas flow from the closed end of the cylinder, into the recess 102 of piston part 36, through the aperture 84 of the bushing part 38, thence through slots 74 in the base of the standpipe and into the other chamber of the counterbalance unit.

The crimped end of cylinder 32 contains the end retainer bushing 60 (see FIG. 5) which is cupped to receive and retain an O-ring seal 108 which wipes the shaft and collects a small amount of oil which stays on the shaft during the expansion stroke and reapplies it to the shaft during the compression stroke. Note: the I.D. of the outer end of bushing 60 is slightly larger than the shaft I.D. to avoid a close running fit which could create an undesirable friction drag. However, the piston shaft will normally cant slightly and contacts the inside of the bushing 60 along a line contact which can aid in providing an electrical conductivity path if the link is used as an electrical connector.

The metal washer 61 has a close static fit within the cylinder 32 and a close sliding fit with shaft 46 thereby providing the function of radial bearing between the reciprocating shaft and the cylinder. Washer 61 is made from a soft metal to avoid marring the shaft. Because the washer always contacts the shaft and the cylinder, it provides an excellent electrically conductive path which can be enhanced by making the washer from brass.

The metal washer 61 (brass) provides a firm backup between the bushing 60 and the Teflon washer 59 and has a free sliding fit with the shaft 46. It prevents the Teflon washer from being deformed and forced into the bushing 60 and pressed against the shaft 46. The Teflon washer 59 provides a resilient backing for the Quad seal 58 (see FIG. 6) which provides a multiple circumferential line contact with both the shaft 46 and interior cylinder surface, in effect acting like plural (3) small O-rings. The Quad seal serves as an excellent bi-directional seal between the shaft and cylinder with relatively low friction forces against the shaft during expansion and contraction strokes. When a bi-directional seal is used with a cylinder configured in accord with this disclosure, the cylinder should be pressurized with the gas prior to and while the seal around the shaft is inserted into the cylinder.

Shown in FIGS. 1, 2 and 3 immediately adjacent the seal 58 and located between seal 58 and the cylinder indention 63 is the aforementioned special cup-shaped bushing 56 (see also FIGS. 4, 7 and 8) preferably made from plastic, but can be made from any material. Bushing 56 has a flat bottom 110 which is apertured with an opening 112 providing a sliding fit on shaft 46, and, in assembly, the bottom abuts the Quad seal 58, which is a multi-lobed omni-directional type seal ring. To assure free flow of lubricating oil past the bushing 56, notches 114 are provided around its bottom opening 112, four such notches 114 being shown in FIG. 8. Bushing 56 has a cylindrical wall 116 with an outer diameter dimensioned to provide a sliding fit within the cylinder 32. Bushing 56 is kept adjacent the Quad seal by the limit bead 63 which is rolled into the cylinder after the piston end of shaft 46 with the attached piston and standpipe assembly 34 is inserted into the cylinder. The limit bead 63 (as seen in FIG. 3) prevents the piston bushing part 38 from engaging the cup-shaped bushing 56 at the limit of the expansion stroke and likewise prevents the standpipe 44 from bottoming in the cup-shaped bushing.

The inside diameter of the cup-shaped bushing 56 is slightly greater than the outside diameter of the standpipe 44 which results, when the standpipe 44 telescopes into the cup-shaped bushing, in an annular cylindrical spacing 120 (see FIG. 3) which is an effective liquid flow metering passage which, as will be described, resists flow of oil at the end portion of the expansion stroke. For example, in a unit which has been satisfactorily produced and operated, the O.D. of standpipe 44 is 0.562 inch and the I.D. of cup-shaped bushing is 0.632 inch providing a annular metering passage with a radial width dimension of 0.035 inch.

OPERATION OF COUNTERBALANCE

Pneumatic or gas springs or counterbalance units have traditionally used a small amount of oil within the cylinder for lubrication purposes and in some cases, that small amount of oil, when disposed in the piston shaft end of the cylinder, is used to provide damping of piston movement at the end of the expansion stroke. However, when the spring or counterbalance, in the compressed condition is inclined with the shaft angled upwardly, the oil slowly flows past the piston out of the shaft side of the cylinder and creates a non-lubricated stroke with no expansion stroke damping.

The construction hereinbefore described provides a solution to always assure a proper amount of the oil being in the shaft side of the cylinder. One important feature is to structure the piston components with a bi-directional O-ring seal 40 which always seats against seating surface 90 in the piston part 38 and is always in sealed contact with the inner surface of the cylinder 32. Thus no oil can leak past the piston ring seal but must flow through the piston via a path (84) through the piston radially inward of the sealing O-ring. The standpipe 44 has been added on the shaft side of the piston to direct oil and gas flow to the piston through flow path while providing a reservoir in the space between the standpipe and the cylinder wall.

Turning to FIG. 1, the position I of the counterbalance (gas spring) 20 corresponds to a representative automotive installation with the hatch closed (FIG. 1A-Position I), the compressed condition of the counterbalance with its shaft end angled upward. Most of the lubricating oil 64 is trapped on the shaft side of the piston in the reservoir space around the standpipe 44. Any oil which was above the open end of the standpipe passes down and through the piston via passage 84 and the orifice metering groove 104 into the lowermost or closed end of cylinder 32. The oil around the periphery of standpipe 44 cannot flow past the piston because of the bi-directional sealing effect of the O-ring 40 part of the piston ring assembly.

As the hatch 24 is opened and the counterbalance shaft moves through its expansion stroke, the counterbalance position shifts past a horizontal disposition (as in position II, FIG. 1A and FIG. 2) and the oil 64 flows toward the shaft seal 58 and into the cup-shaped bushing 56, see FIG. 2. During this expansion movement the pressurized gas is moving from the shaft side, through the standpipe and the piston metering orifice groove 104 to the other side of the piston. Note that the wall of cup bushing 56 takes up space within the shaft end of the cylinder and displaces the oil 64, to a confined space around the shaft 46, as it flows into the cup bushing.

When the hatch is in the full open position III, see FIGS. 1A and 3, the counterbalance at the end of its expansion stroke is positioned with the shaft end angled downward and the piston assembly has reached the end limit of its stroke. As the piston nears end position, oil 64 collected in the bushing 56 and between the bushing 56 and the reservoir around standpipe 44 is forced to translate into the standpipe part of the oil having to be forced through the small annular passage 116 as the standpipe telescopes into the bushing 56, which creates an initial secondary slowdown or minor damping to the controlled velocity of the expansion movement. The final increase in damping occurs as oil forced into the standpipe flows through the piston passage and, via a metered flow path, through the piston orifice grooves 104, which are still in a flow metering condition because pressure is forcing Oring against washer ring 42 and holding the washer ring against the peripheral flange 100 of piston part 36.

In position III, oil 64 is partially within the cylinder 32 on the opposite side of the shaft end of the piston and because the counterbalance is positioned with the shaft end angled down, the oil 64 is collected and resting on the piston part 36. Under this condition when the hatch lid is being moved toward a closed condition, the counterbalance being compressed, the flow path for gas and oil is back past the piston assembly to the shaft side. During the compression stroke the washer 42 moves away from the flange 100 of piston part 36 and provides a free flow path past piston part 36 and thence into the flow passage 84 and then through the standpipe 44 into the cup-shaped bushing 56, whereupon most of the oil 64 is back on the shaft side of the piston assembly as shown in FIG. 2. As the counterbalance is further compressed and moves back to the FIG. 1 position the oil assumes the location shown in FIG. 1 occupying the reservoir space around the standpipe 44.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A pneumatic spring link comprising: a cylinder assembly with a closed end; a piston assembly in said cylinder with a piston shaft extending from the other end of said cylinder, a cylinder end bushing on said shaft, an annular seal means around said shaft adjacent said end bushing, said piston assembly including a piston means with piston ring means and being fixed on the end of said shaft within said cylinder; the other end of said cylinder including means to retain said bushing within said cylinder: said seal means providing a static seal against said cylinder, and a dynamic seal around said shaft; said piston means and piston ring means providing means enabling metered orifice by-pass flow of fluid across said piston means during the extension stroke and a free flow by-pass fluid communication path across said piston means during the retraction stroke; a predetermined small quantity of oil in said cylinder; a predetermined quantity of gas under at least several atmospheres of pressure in said cylinder; said piston ring means including a bi-directional ring seal retained in the periphery of the piston means and providing a constant bi-directional seal between the piston means and the cylinder inner wall surface; the means enabling flow of fluid across said piston means including a flow passage to the shaft side of said piston radially inward of the bi-directional seal; and means on the shaft side of said piston assembly including a tubular sleeve surrounding said shaft with its interior spaced from said shaft and its exterior spaced from said cylinder wall, and with one end rigidly secured to the shaft side of said piston means to confine fliuid flow across said piston means only through said piston means flow passage to and from the interior of said tubular sleeve; the other end of the tubular sleeve being open to provide free fluid flow into and out from said sleeve; said sleeve having a length dimension placing its said other end close to but spaced from said shaft seal means at the extenstion stroke limit position; the predetermined quantity of oil substantially exceeding the free space volume on the shaft side of the piston assembly when the shaft is at the extension stroke limit position; whereby a portion of said oil flowing through the sleeve and the piston assembly is subjected to metered flow to damp the final portion of extension stroke movement.

2. A pneumatic spring link as defined in claim 1, wherein said sleeve is cylindrical and a cydindrical bushing is located in the crimped end of the cylinder with one of the bushing ends disposed adjacent said shaft seal and its other end being open and facing the piston assembly; the inner diameter of said cylindrical bushing being dimensioned to enable said sleeve to coaxially telescope therein with an annular spacing between the cylindrical bushing and said sleeve.

3. A pneumatic spring link as defined in claim 2, wherein said piston end of said shaft has a reduced diameter portion providing a stepped shoulder on said shaft; said tubular sleeve has an apertured base wall disposed over said reduced diameter shaft end; said piston assembly is coaxially mounted on said reduced diameter shaft end; means rigidly secure said piston means and an annular end portion of said sleeve in abutting oil-tight clamped relation with each other and with the base wall of said sleeve tightly clamped against said stepped shoulder; said piston means flow passage radially inward of said bidirectional seal is in fluid communication via the apertured base of said sleeve to the space between said sleeve and said shaft.

4. A pneumatic spring link as defined in claim 3, wherein said piston means has at least two parts which, in assembly on the shaft end, are clamped together and said clamped piston means parts comprise a configuration providing a peripheral recess including an annular stepped cylindrical seat for retaining said bi-directional seal ring and an annular recess adjacent the annular stepped seat; said piston ring means includes a flat metal washer disposed in said annular recess and dimensioned for slight axial movement within said recess; the outside diameter of said washer being dimensioned to provide a free close running fit within said cylinder wall; one of said piston means parts which is closest to the shaft end of said cylinder, being dimensioned for a free running fit with said cylinder, includes said annular seat and includes said flow passage axially disposed therethrough radially inward of said annular seat, opening into the shaft side of said cylinder; the other of said piston means parts being closest to said closed end of the cylinder including a central boss engaging said one piston means part, an annular undercut on its side facing said one part and an annular axial peripheral flange facing said one part; said flange and said undercut in assembly being spaced from said one part to provide said annular recess containing said metal washer; the outer diameter dimension of said other piston means part being less than the inside dimension of said cylinder so that an annular space is provided therebetween to enable free flow of fluid past the periphery of said other part; said axial flange having at least one laterally disposed metering groove, in its edge, facing said metal washer; whereby during an extension stroke said bi-directional ring seal shifts on its annular seat to engage and seal against said washer and urge said washer into annular engagement with the edge of said axial flange except at said metering groove to thereby create a metered orifice defined by said washer and said groove.

5. A pneumatic spring link as defined in claim 4, wherein said washer is made from brass.

6. A pneumatic spring link as defined in claim 5, wherein said end bushing is made from brass.

7. A pneumatic spring link as defined in claim 6, wherein said one part of said piston means is made from copper steel.

8. A pneumatic spring link as defined in claim 4, wherein said end bushing is made from brass.

9. A pneumatic spring link as defined in claim 8, wherein said one part of said piston means is made from copper steel.

10. A pneumatic spring link as defined in claim 4, wherein said one part of said piston means is made from copper steel.

11. A pneumatic spring link as defined in claim 1, wherein said piston end of said shaft has a reduced diameter portion providing a stepped shoulder on said shaft; said tubular sleeve is cylindrical with an apertured base wall disposed over said reduced diameter shaft end; said piston assembly is coaxially mounted on said reduced diameter shaft end; means rigidly secure said piston means and said sleeve together and in abutting clamped relation with the base wall of said sleeve tightly clamped against said stepped shoulder; said piston means flow passage radially inward of said bi-directional seal is in fluid communication via the apertured base of said sleeve to the space between said sleeve and said shaft.

12. A pneumatic spring link as defined in claim 1, wherein said piston means has at least two parts which in assembly on the shaft end are clamped together and said clamped piston means parts comprise a configuration providing a peripheral recess including an annular stepped cylindrical seat for retaining said bi-directional seal ring and an annular recess adjacent the annular stepped seat; said piston ring means includes a flat metal washer disposed in said annular recess and being dimensioned for slight axial movement within said recess; the outside diameter of said washer being dimensioned to provide a free close running fit within said cylinder wall; one of said piston means parts which is closest to the shaft end of said cylinder, being dimensioned for a free running fit with said cylinder, includes said annular seat and has an axially disposed flow passage therethrough radially inward of said annular seat, opening into the shaft side of said cylinder; the other of said piston means parts being closest to said closed end of the cylinder including a central boss engaging said one piston means part, an annular undercut on its side facing and an annular axial peripheral flange facing said one part; said flange and said undercut in assembly being spaced from said one part to provide said annular recess containing said metal washer; the outer diameter dimension of said other piston means part being less than the inside dimension of said cylinder so that an annular space is provided therebetween to enable free flow of fluid past the periphery of said other part; said axial flange having at least one laterally disposed metering groove, in its edge, facing said metal washer; whereby during an expansion stroke said bi-directional ring seal shifts on its annular seat to engage and seal against said washer and urge said washer into annular engagement with the edge of said axial flange except at said metering groove to thereby create a metered orifice defined by said washer and said groove.

13. A pneumatic spring link as defined in claim 12, wherein said washer is made from brass.

14. A pneumatic spring link as defined in claim 12, wherein said end bushing is made from brass.

15. A pneumatic spring link as defined in claim 12, wherein said one part of said piston means is made from copper steel.

16. A pneumatic spring link as defined in claim 12, wherein said washer and said bushing are made from brass and said one part of said piston means is made from copper steel.

17. A pneumatic spring device as defined in claim 1 wherein said bi-directional seal ring is an elastomeric O-ring.

18. A pneumatic spring device as defined in claim 1, wherein said shaft seal means includes a bi-directional multilobe seal.

19. A pneumatic spring device as claimed in claim 18, wherein said cylinder is pressurized with gas under multiple atmospheres of pressure prior to assembly of said multilobe seal into the cylinder followed by crimping of said other end of the cylinder.

20. A pneumatic spring link comprising: a cylinder assembly with a closed end; a piston assembly in said cylinder with a piston shaft extending from the other end of said cylinder, a cylinder end bushing on said shaft, an annular seal means around said shaft adjacent said end bushing, said piston assembly including a piston means with piston ring means and being fixed on the end of said shaft within said cylinder; the other end of said cylinder including means to retain said bushing; said seal means providing a static seal against said cylinder, and a dynamic seal around said shaft; said piston means and piston ring means providing means enabling metered orifice by-pass flow of fluid across said piston means during the extension stroke and a free flow by-pass fluid communication path across said piston means during the retraction stroke; a predetermined small quantity of oil in said cylinder; a predetermined quantity of gas under at least several atmospheres of pressure in said cylinder; said piston ring means including a bi-directional ring seal means retained in the periphery of the piston means and providing a seal between the piston means and the cylinder inner wall surface; the means enabling flow of fluid across said piston means including a flow passage to the shaft side of said piston radially inward of the peripheral bi-directional ring seal means; said piston means having at least two parts which in assembly on the shaft end are clamped together and said clamped piston means parts comprise a configuration providing a peripheral recess including an annular inset cylindrical seat for retaining and seating at least a part of said bi-directional seal ring means and an annular recess adjacent the annular inset seat; said piston ring means includes a flat metal washer disposed in said annular recess and being dimensioned for slight axial movement within said recess; the outside diameter of said washer being dimensioned to provide a free running fit within said cylinder wall; one of said piston means parts which is closest to the shaft end of said cylinder, being dimensioned for a free running fit with said cylinder, includes said annular seat and includes an axially disposed said flow passage therethrough radially inward of said annular seat, opening into the shaft side of said cylinder; the other of said piston means parts being closest to said closed end of the cylinder, including a central boss engaging said one piston means part, an annular undercut on its side face and an annular axial peripheral flange facing said one part; said flange and said undercut in assembly being spaced from said one part to provide said annular recess containing said metal washer; the outer diameter dimension of said other piston means part being less than the inside dimension of said cylinder so that an annular space is provided therebetween to enable free flow of fluid past the periphery of said other part; said axial flange having at least one laterally disposed metering groove, in its edge, facing said metal washer; whereby during an extension stroke said bi-directional ring seal means shifts on its annular seat and provides a seal between said cylinder and against said washer and urges said washer into annular engagement with the edge of said axial flange except at said metering groove to thereby create a metered orifice defined by said washer and said groove.

* * * * *

UNITED STATES PATENT AND TRADEMARK OFFICE
CERTIFICATE OF CORRECTION

PATENT NO. : 4,570,912

DATED : February 18, 1986

INVENTOR(S) : Daniel P. Dodson & George C. Ludwig

It is certified that error appears in the above-identified patent and that said Letters Patent is hereby corrected as shown below:

Column 3, line 18, "coorelate" should be --correlate--

Column 7, line 45, "Oring" should be --O-ring--

Column 8, line 55, change "the crimped" to --said other-- to correlate with antecedent basis in claim 1

Signed and Sealed this

Fifth Day of August 1986

[SEAL]

Attest:

DONALD J. QUIGG

Attesting Officer

Commissioner of Patents and Trademarks